Dec. 3, 1957  A. W. C. TAYLOR  2,815,391
DIRECT CATALYTIC HYDRATION OF OLEFINES TO ALCOHOLS
Filed Feb. 6, 1953
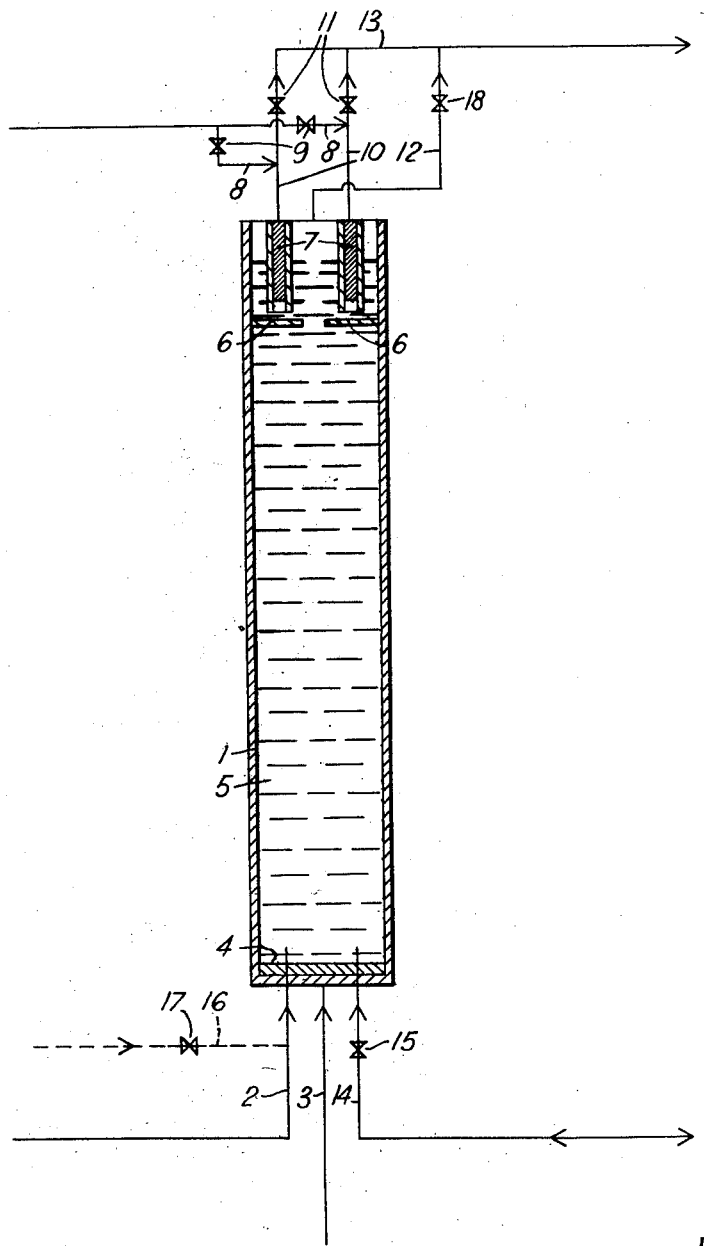
Inventor
Arthur William Charles Taylor
By Cushman, Darby & Cushman
Attorney

United States Patent Office 2,815,391
Patented Dec. 3, 1957

2,815,391
DIRECT CATALYTIC HYDRATION OF OLEFINES TO ALCOHOLS

Arthur William Charles Taylor, Norton-on-Tees, England, assignor to Imperial Chemical Industries Limited, a corporation of Great Britain Application February 6, 1953, Serial No. 335,430
Claims priority, application Great Britain February 20, 1952

11 Claims. (Cl. 260—641)

This invention relates to the direct catalytic hydration of olefines to alcohols in the presence of solid, non-corrosive catalysts.

It has already been proposed to produce alcohols directly by passing an olefine and water, at elevated temperature and pressure, into a bath of an acid such as sulphuric acid or phosphoric acid. It has also been proposed to carry out this process in the vapour phase by passing a gaseous olefine and water vapour over a catalyst comprising sulphuric or phosphoric acid supported on an inert porous material such as pumice. The use of such corrosive catalysts is avoided by further proposals to hydrate olefines in the vapour phase using solid catalysts comprising a carrier supporting a metal such as a noble metal, copper, iron, chromium, or a metallic oxide such as alumina or aluminium borate or alumina/tungstic acid, blue oxide of tungsten, mixtures of tungsten trioxide with other metallic oxides and tungstic acid ($H_2WO_4$), i. e., catalysts which in this specification are to be understood as non-corrosive catalysts.

More recent proposals have been to carry out the hydration of propylene or a butylene at elevated pressure, for example in the range 100 to 500 atmospheres, say 250 atmospheres and at temperatures in the range of for example 150° to 300° C., preferably 250° to 290° C. for propylene, in the range 160° to 220° C. for isobutylene and in the range 230 to 270° C. for butene-1 and butene-2, using an unsupported pelleted catalyst consisting of the blue oxide of tungsten prepared by reducing, at elevated temperature, a hydrated tungsten trioxide (so-called commercial tungstic acid) or ammonium paratungstate, and in the presence of a large stoichiometric excess of water. The pelleted catalysts used in these processes are produced by the application of high mechanical pressure to powdered or granulated catalytic material. These processes have thus been carried out under reaction conditions and water:olefine ratios such that the hydration reaction has occurred in the presence of liquid water. When these processes are operated using pelleted catalysts, improved results have been obtained by feeding the reactants to the converter in co-current downward flow. For example, for propylene hydration at elevated pressure the optimum temperature was found to be 270° C. or thereabouts, and under these conditions the catalyst is irrigated with water. However, a converter for use in this method of operation has to be designed with great care to meet requirements such as the provision of good liquid distribution throughout the converter and to comply with limitations imposed on converter depth by the need to avoid flooding the catalyst bed with water. Furthermore, operation of this type makes exacting demands on the catalyst, in particular that it shall not be appreciably soluble or liable to erosion or any other type of disintegration when in contact with liquid reactants, for example with water or dilute isopropanol solution at about 270° C. These demands on the catalyst are in addition to those which would have to be met in any case, such as high activity at a temperature low enough to permit a reasonably favourable reaction equilibrium and freedom from undesirable polymerisation and/or dehydrogenation activity.

The present invention provides an improved method for the direct hydration of olefines, in the presence of solid catalysts, for the production of the corresponding alcohols, which giving satisfactory yields of alcohol, avoids the need to provide for the presence of large quantities of catalyst produced by expensive and complicated pelleting methods. More particularly the present invention avoids substantial loss of solid catalyst from the reaction space, for example by erosion or any other type of mechanical disintegration. Further objects of the invention are to facilitate intimate contact between the reactants and the whole mass of the solid catalyst, as compared with mere contact with the geometric surfaces of the pelleted catalyst, and to decrease the amount of catalytic material required for a given alcohol production. Other objects and advantages of the invention will become evident subsequently in the specification.

According to the present invention therefore there is provided a continuous process for the production of monohydric aliphatic alcohols which comprises passing water and a monoolefine containing 2 to 4 carbon atoms in the molecule into a suspension, in a liquid medium comprising water, of a catalyst containing an oxide of tungsten, while maintaining the reaction mixture at elevated temperature and pressure, withdrawing liquid from the reaction space and treating it for the recovery of the desired alcohol.

The mono-olefine, as stated above should contain 2 to 4 carbon atoms and in particular should be ethylene, propylene or butylenes. It should be understood that mixtures of these olefines may be used in the process of the present invention. The olefine may be introduced into the reaction space as a liquid or as a gas. It is desirable that the olefine should not be accompanied by undue quantities of di-olefines. For example 1.4% by volume of butadiene can be tolerated in the process of the present invention, whereas in the process using pelleted catalyst and reactants in co-current downward flow this concentration would be accompanied by operational difficulties due to polymer formation.

The oxide of tungsten we prefer to use is the blue oxide of tungsten prepared by reduction of hydrated tungsten trioxide, i. e., the so-called commercial tungstic acid. This preferred oxide may be made from hydrated tungsten trioxide by reduction at elevated temperature externally to the vessel in which the hydration of olefine is to be carried out or the hydrated tungsten trioxide may be charged directly to the vessel. Alternatively this blue oxide may be prepared for subsequent charging to the reactor by reducing ammonium paratungstate at elevated temperature.

Other oxides of tungsten may however be used in the process of the present invention such as the dioxide and trioxide.

The catalyst may be in the form of granules or small pieces, but for ease of catalyst preparation and improved results, it is preferable for it to be in powder form. Initially the suspension of catalyst in a liquid medium may be prepared with water and thereafter it may be water plus reaction products. It may also be prepared using a mixture containing water and the alcohol it is desired to make. A good distribution of catalyst material in the liquid within the converter may be maintained by mechanical stirring and/or arranging for suitable flow of reactants through the converter.

In general the temperature of operating the process of the present invention will fall in the range 150° to 350° C., the optimum temperatures varying with the olefine being hydrated. Preferred temperatures for operation with ethylene fall within the range 280° to 310° C., preferred temperatures for operation with propylene fall within the range 250° to 290° C., while for isobutylene and normal butenes, the preferred temperature ranges are 160° to 220° C. and 230° to 270° C.

A wide range of operating pressures may be used according to the process of the present invention, consonant with the presence of liquid (water) in the reaction space. For the olefines of the present invention a pressure in the neighbourhood of 250 atmospheres gives satisfactory results.

It is desirable to make provision to retain the whole of the suspended catalyst within the reaction space. This may be done by withdrawing liquid from the reaction space through one or more suitable filters, which may be a thimble or other construction made from porous ceramic material, porous sintered metal such as bronze, or edge filters may be used. The filters are preferably arranged so that the separated catalyst is immediately returned to the body of liquid within the reaction space: thus the filters may be installed within the converter in which the reaction is carried out. More preferably the filters are arranged at the top of the converter and are provided with means for reversing the flow of liquid through them in such a manner that accumulated catalyst deposited on the filters is detached and washed back into the reaction space. This may be achieved by arranging for an external supply of liquid or gas to be fed periodically to the filters in a direction which is the reverse of that with which filtration is being affected. With this construction, it is preferable to arrange for the linear velocity of reactants through the converter to be at a suitable value so that a high proportion of the catalyst particles occupy only part of the converter, forming a suspension having a high particle concentration with a more or less well defined upper surface within the liquid medium, the remaining, upper part of the suspension having a low particle concentration. Under these conditions the amount of catalyst reaching filters is small and the frequency with which they have to be freed of accumulated catalyst to permit the maintenance of the desired flow of liquid without a high pressure drop across them is very considerably reduced. The maximum permissible rate of reactants which may be fed to a converter while still maintaining the condition that the suspension having a high particle concentration does not reach the filters depends for example on the converter dimensions, the ratio of water and olefine, the nature of the olefine feed, the temperature and pressure in the converter, the amount of catalyst in the converter and the nature and particle size of the catalyst. By operating in this way to produce a zone of high catalyst particle density, the use of filters may be avoided but for good results they are desirable.

The present invention facilitates operation of converters in parallel, since similar converters will, provided they contain similar depths of liquid, offer equal resistances to the flow of reactants. They can thus receive substantially equal proportions of the total flow of reactants without the need for careful measurement and control of individual feed rates. The ease with which catalyst material can be withdrawn or added continuously or batchwise to the converter is another advantage of the invention.

EXAMPLE 1

The invention will be explained in more detail by reference to the single figure of the accompanying drawing, which illustrates, by way of example, one way in which the invention may be carried into effect. It is assumed that the olefine to be hydrated is propylene which by hydration is turned into isopropanol, and that the catalyst used is in a finely divided condition.

In the figure, 1 is the converter into which the reactants, free from catalyst and preheated to reaction temperature, are introduced at the base, the preheated liquid water being fed through inlet 2 and the preheated propylene through inlet 3 and via a distributor 4 which may for example be a sparger or a porous plate of sintered metal or ceramic material. 5 indicates the suspension, in a liquid phase, of finely divided catalyst which initially may be finely divided commercial tungstic acid: this suspension is maintained by the rising stream of water and by the rising bubbles of propylene. Near the top of the converter 1 there are provided deflector baffles 6 which effect a primary separation between the gas and liquid phases and remove most of the suspended catalyst material from the gas and liquid about to leave the converter. The liquid subsequently passes through filters 7 which are of porous sintered bronze and are preferably so arranged that while one is working the other is regenerating by being washed with water introduced at high pressure through either of inlets 8 with valves 9. The filtered liquid leaves through outlets 10 with valves 11, and the gaseous material leaves through outlet 12 and valve 18. The combined outgoing material may be taken through an outlet 13 to a cooler which conveniently is also a preheater for the reactants and through any other suitable means for further processing, separation, storage or other purposes. Catalyst suspension may be added to or withdrawn from the converter, batchwise or continuously, as a slurry through connection 14 and valve 15, and provision may also be made, for example, for doping the contents of the converter, for example in order to control the pH value, such as is indicated in dotted lines by inlet 16 with valve 17.

EXAMPLE 2

The following record of experiments illustrates the results obtained with various amounts of catalyst in the converters, the particle size of the catalyst and the feed rates of the reactants. The catalyst charged was initially commercial tungstic acid $(WO_3 \cdot xH_2O)$.

Table I

Catalyst density as charged 5.5 grams per cc.
Temperature: 270° C.
Feed ratio water:propylene=7.5:1 by weight.
Pressure: 250 atmospheres.

| | | | | | |
|---|---|---|---|---|---|
| Concentration of powdered catalyst in suspension, kg./cubic metre | 50 | 100 | 300 | 65 | 100 |
| Maximum water rate. Tonnes per hour per square metre of converter cross section | 18.3 | 13.6 | 7.3 | 25.0 | 20.2 |
| Output of isopropanol: tonnes/hour per tonne of catalyst | 1.6 | 0.7 | 0.165 | 1.23 | 0.9 |
| Catalyst particle size | 66%<5μ | | | 52%<5μ | |

In the above table the concentrations of powdered catalyst are those attained at the maximum water rate. Also the maximum water rate refers to that rate above which there is a considerable increase in the pressure drop across the converter, indicating that the suspension of higher particle concentration had reached the filters and was affecting their operation.

EXAMPLE 3

The advantages of the present invention are illustrated by the results summarised in Table II for the hydration of propylene to isopropanol using tungstic oxide (initially commercial tungstic acid) as the catalyst.

Table II

Catalyst density as charged: 5.5 gm./cc.
Temperature: 270° C.
Feed ratio: water:propylene=7.5:1 by weight.
Pressure: 250 atmospheres.

| Form of catalyst | Powder | Pellets |
|---|---|---|
| Kg. of catalyst per cubic metre of converter space | 50 | 2,550 |
| Water feed rate. Tonnes per hour per square metre of converter cross section | 18.3 | 21.4 |
| Output of isopropanol, tonnes/hour/tonne of catalyst | 1.6 | 0.0635 |

The second column shows the results obtained by operating according to the present invention while the third column shows typical results for operation with a pelleted catalyst under conditions which give a good combination of isopropanol output and catalyst life. The great decrease in the catalyst charge per unit of isopropanol output is seen. As compared with operation with pelleted catalysts, it will be seen that only about 1/50 of the quantity of catalyst need be present in the converter and the output of alcohol per hour per tonne of catalyst is about 25 times as high, these advantages being attainable in simple apparatus, without the initial expense incurred in producing pelleted catalyst and without the need to use expensive processes to regenerate large quantities of spent catalyst.

EXAMPLE 4

Isobutene was hydrated to give tertiary butanol using apparatus as described in Example 1 and a catalyst charge which initially was commercial tungstic acid in powder form of which 66% was less than $5\mu$ particle size, the density of the material being 5.5 grams/cc., the converter containing 100 kgs. of catalyst per cubic metre of space. The hydrocarbon feed to the apparatus was a gaseous butene/butane mixture containing 16.5% by volume of isobutene. The results obtained were as follows:

Table III

| Temperature, °C | 200 | 220 | 250 |
|---|---|---|---|
| Water+liquid hydrocarbon fed, m.³/m.³/Hour | 1.0 | 1.0 | 1.1 |
| Ratio Water/C₄H₈, weight | 41 | 47.5 | 40 |
| Conversion of C₄H₈ to tert. butanol, percent | 19.5 | 17 | 10 |
| Formation of hydrocarbon polymer | (¹) | (¹) | (¹) |

¹ Not detectable.

EXAMPLE 5

A mixture of normal butenes was hydrated under conditions the same as those of Example 2 except that the temperature was maintained at 270° C. The results obtained here were as follows:

Table IV

Hydrocarbon feed:
 87 molar percent n-butene.
 1.4 molar percent butadiene.
 5.4 molar percent propylene.
 6.2 molar percent saturated hydrocarbons.
Pressure: 250 atmospheres.
Catalyst: 50 kgs./m.³
Temperature: 270° C.

| | | |
|---|---|---|
| Water+liquid hydrocarbon fed, m.³/m.³/hr | 1.35 | 1.70 |
| Ratio water: N-butene, weight | 7.3 | 7.4 |
| Conversion of C₄H₈ to sec-butanol, percent | 11.1 | 9.7 |

As previously indicated liquid and gas may be withdrawn from the reaction zone and treated for the recovery of the desired alcohol. Thus, as indicated in Example 1, while liquid and gas are withdrawn separately from the reaction zone they may be mixed and after passing through a cooler they may be treated as desired, for example the gas after cooling to recover alcohol, may be treated to recovery residual olefine which may be returned to the hydration process, while the liquid may be subjected to distillation, including azeotropic distillation to recover the desired alcohols.

The present invention has important advantages. Thus it avoids difficulties arising from a liability of the catalyst to be mechanically disintegrated although care has still to be taken to ensure that the catalyst is not appreciably soluble in water and in dilute solutions of alcoholic and other products at the temperature of operation. The invention also provides an efficient and simple solution to the problem of ensuring good distribution of liquid over the solid catalyst. The weight of catalyst required per unit reactor volume is very much smaller as compared with operation with a pelleted catalyst, and the expensive processing of the catalyst material to give pellets of high mechanical strength is eliminated.

I claim:
1. A continuous process for the production of monohydric aliphatic alcohols which comprises passing water and a monoolefine containing two to four carbon atoms in the molecule into a suspension, in a liquid medium comprising water of a catalyst in powder form consisting essentially of an oxide of tungsten, while maintaining the reaction mixture with said catalyst at elevated temperature and pressure and in a state of agitation, withdrawing liquid from the reaction spaced and treating it for the recovery of the desired alcohol.

2. A process as claimed claim 1 in which the elevated temperature is in the range 150° to 350° C.

3. A process as claimed in claim 2 in which the pressure is maintained at about 250 atmospheres.

4. A process as claimed in claim 1 in which the liquid medium initially consists of a liquid selected from the group consisting of water and a mixture of water and the alcohol to be produced.

5. A process as claimed in claim 1 in which the olefine and water are passed upwardly through the liquid medium containing said catalyst to thereby agitate said liquid medium and maintain said catalyst in suspension.

6. A process as claimed in claim 5 in which the olefine and water are passed upwardly at such a rate that there is formed within the liquid medium a suspension of catalyst having a high particle concentration and having a well defined upper surface within the liquid medium.

7. A process as claimed in claim 5 in which means are provided near the top of the liquid suspension for separating liquid and gaseous reactants and products from the catalyst.

8. A process as claimed in claim 1 in which the olefine being hydrated is ethylene and the liquid medium is maintained at a temperature within the range of 280–310° C.

9. A process as claimed in claim 1 in which the olefine being hydrated is propylene and the liquid medium is maintained at a temperature within the range of 250–290° C.

10. A process as claimed in claim 1 in which the olefine being hydrated is isobutylene and the liquid medium is maintained at a temperature within the range of 160–220° C.

11. A process as claimed in claim 1 in which the olefine being hydrated is a normal butene and the liquid medium is maintained at a temperature within the range of 230–270° C.

References Cited in the file of this patent
UNITED STATES PATENTS

| | | |
|---|---|---|
| 1,873,536 | Brown et al. | Aug. 23, 1932 |
| 1,907,317 | Brown et al. | May 2, 1933 |
| 2,036,317 | Bent et al. | Apr. 7, 1936 |
| 2,144,750 | Bent | Jan. 24, 1939 |
| 2,171,377 | Tears | Aug. 29, 1939 |
| 2,531,284 | Levy et al. | Nov. 21, 1950 |
| 2,536,768 | Reynolds et al. | Jan. 2, 1951 |
| 2,663,744 | Lukasiewicz et al. | Dec. 22, 1953 |
| 2,755,309 | Reynolds et al. | July 17, 1956 |
| 2,769,847 | Robinson | Nov. 6, 1956 |